Feb. 18, 1969  E. C. JOHNSEN  3,427,924
ELECTRICALLY FIRED GUN AND CARTRIDGE THEREFOR
Filed Oct. 20, 1966

INVENTOR
*Erich C. Johnsen*
BY *Stevens, Davis, Miller & Mosher*
ATTORNEYS

Feb. 18, 1969    E. C. JOHNSEN    3,427,924
ELECTRICALLY FIRED GUN AND CARTRIDGE THEREFOR
Filed Oct. 20, 1966    Sheet 3 of 8

INVENTOR
Erich C. Johnsen

BY Stevens, Davis, Miller & Mosher
ATTORNEYS

Erich C. Johnsen
INVENTOR

United States Patent Office 3,427,924
Patented Feb. 18, 1969

3,427,924
ELECTRICALLY FIRED GUN AND CARTRIDGE THEREFOR
Erich Cornelius Johnsen, 1205 Broad St., Victoria, British Columbia, Canada
Filed Oct. 20, 1966, Ser. No. 588,094
U.S. Cl. 89—135
Int. Cl. F41d 9/02, 11/02
8 Claims

ABSTRACT OF THE DISCLOSURE

An automatic gun for electrically firing a cartridge. The gun is provided with a breech having a pair of blocks. One of the blocks is provided with a pair of electric contacts. The cartridge is provided with a similar pair of contacts. The pairs of contacts are engaged when the gun is loaded. A pair of electrical circuits are supplied for firing the cartridges. The trigger is operated to a first position to complete one circuit for firing a single shot or to provide for continuous firing and is moved to a second position to complete a second circuit for providing a preselected firing pattern.

---

This invention relates to a hand gun and the cartridge therefor and more particularly to an electrical trigger operated hand gun capable of firing single cartridges or of firing cartridges in rapid succession at known time intervals and a cartridge therefor which is not ejected from the gun after firing.

The art of guns and gun production is quite old and, accordingly, many classifications and varieties of guns have been known throughout the centuries. However, there is always a desire to improve upon the art. It is always desirable to produce guns which are of lighter weight, which are capable of firing either single shells or plural shells in rapid succession, which may be operated easily without causing gun movement and thereby misdirection of a shot, easy removal of spent cartridges, etc. Improvements of the above features of guns are continually sought and research is continually carried out in these and other areas.

In accordance with the present invention, there is provided a light weight gun having a large cartridge capacity which may be easily fired by a trigger controlled electrical circuit, which requires very little trigger pressure and wherein there is no requirement for ejection for spent cartridge shells since the shells themselves provide the projectile from the gun. There is also provision for single or multiple firing and the rate of multiple firing may be controlled in an electrical manner.

Briefly, the gun includes a trigger which operates as an electrical switch and which, when depressed to a first position, completes a circuit to batteries in the gun handle and allows current to travel to the ignition portion of a cartridge and cause ignition of the explosive mixture therein. The explosion causes a first hollow cartridge end to be ejected therefrom and be propelled out through the barrel of the gun in conventional manner. The projectile is formed by the combination of the end cap of the cartridge in which the explosion has taken place and the spent hollow cartridge of the previously exploded member which has been retained within the gun barrel and which, together with the end cap, is projected out through the barrel. This hollow projectile is provided with a rotary motion due to the rifling in the barrel as is well known in accordance with one embodiment of the invention. In accordance with a second embodiment, the projectile has a weighted front to provide balance and eliminate the necessity of rifling. A magazine is provided on the gun having bullets or cartridges therein which are loaded into the barrel of the gun by means of a loading piston which operates through a recoil tension spring. The loading piston pushes the bullet through a pair of breech blocks so that it contacts the spent cartridge of the previously used bullet and places the gun in condition for firing. Upon firing, some of the gas produced in the barrel acts to retract the loading piston and place a new cartridge into the barrel automatically.

The trigger device also has a second retracted position at which point the gun is caused to fire in the manner described hereinabove. However, in this second retracted position, a bi-metallic member heats up and opens the circuit and then closes the electrical circuit after a predetermined time, dependent upon the materials used in the bi-metal and the degree of trigger depression, thereby providing the necessary currents to the next cartridge loaded into the gun barrel to cause explosion and firing of the projectile. In this situation, the trigger need be held in the depressed condition and it is merely necessary that the load piston be operated to continually place unspent bullets into the gun barrel.

The cartridge utilized in the above described gun is composed of a steel cartridge sleeve having a Teflon or nylon, etc., jacket therearound to prevent excessive friction. The sleeve is closed at the front end by a nylon top cap and a main charge is positioned just behind the nylon top cap and within the steel sleeve. At the rear portion of the steel sleeve, there is positioned a nylon end cap which is secured within the sleeve, the end cap including a negative electrical contact passing from the outer portion thereof into the main body of the sleeve and a positive electrical contact also passing therethrough into the inner portion of the sleeve. Within the sleeve is positioned a glass or plastic capsule which encloses sodium hydroxide, magnesium and sulfur in fine powdered form in equal proportions and a tungsten filament connecting the positive and negative contacts. Also positioned therein is pure oxygen or pure argon gases. This bullet is designed to cause an explosion upon the placement of a voltage across the positive and negative contacts by operation of the trigger to project the nylon top cap outwardly in a well-known manner, the spent shell being retained in the gun barrel and not undergoing any movement.

It is therefore an object of this invention to provide a battery operated trigger controlled gun utilizing a relatively low voltage battery supply.

It is a further object of this invention to provide a portable gun having few moving parts and requiring no cartridge ejection mechanism.

It is a still further object of this invention to provide a portable gun having improved resistance to outer elements and having an inner working element substantially sealed from the atmosphere.

It is a yet further object of this invention to provide a portable gun capable of firing a plurality of cartridges in succession, the rate of firing being controlled by a bi-metallic switch element.

It is a yet further object of this invention to provide a portable gun having a spring biased breech block, the breech block elements being tapered and movable against the bias of springs by the entrance of a cartridge into the gun barrel, the breech blocks reclosing after entry of the cartridge to separate the gun barrel from the cartridge storage chamber.

It is a yet further object of this invention to provide a cartridge or bullet for a gun having a nylon or Teflon coated cylinder to provide minimal friction with the gun barrel.

It is a yet further object of this invention to provide a cartridge or bullet having a self-retracting rear nylon cap.

It is a still further object of this invention to provide a cartridge or bullet wherein the whole cylinder is utilized as both cartridge and projectile to eliminate the necessity of ejecting spent cartridges.

The above objects and still further objects of this invention will become apparent to those skilled in the art when considered in view of the following drawings of a specific preferred embodiment of the invention which is provided by way of example and not by way of limitation wherein:

Referring particularly to FIGURES 1 to 4, there are shown elevational views of the preferred embodiment of the gun in accordance with the present invention including a handle 2 which can be formed from any desired material as, for example, nylon. The handle is mounted at the forward end of the barrel, there also being a sight 4 mounted at the upper portion of the barrel attached end of the handle. The barrel 6 includes a raised portion 8 (to be explained hereinbelow) and a fastening screw 10 which passes through one portion of the handle 12 to secure the handle to the main portion of the gun. The handle 12 includes a trigger member 14 mounted therein, a battery compartment 16 and a battery compartment cap 18 threaded thereon. Also mounted on the handle 12 is a safety lock 20 which is conventional. The operation of the safety lock of the present invention, which is novel, will be described in detail hereinbelow. A fastening screw 17 fastens the inner parts to the surrounding handle. The gun further includes a breech block compartment 24 and a magazine 22 for receiving bullets or cartridges. The gun also includes a loading piston and handle 26, the piston portion (not shown in FIGURES 1 to 4) being enclosed within the end cap 28 and the pistol case 30, an end cap-fastening screw 32 being shown which fastens the end cap to the pistol case and adjusts the tension in the recoil spring in a manner set forth hereinbelow.

Also shown is a gas operated loading piston 31 which is preferably made of nylon or a similar material. At FIGURES 1, 2 and 4, there is also shown a gas pressure adjustment screw 33. The elements 31 and 33 will be disclosed in detail hereinbelow. There is also an orifice between the barrel 6 and the reloading piston, the purpose of which is to provide automatic reloading and which will also be described in more detail hereinbelow.

Figures 5, 6A:
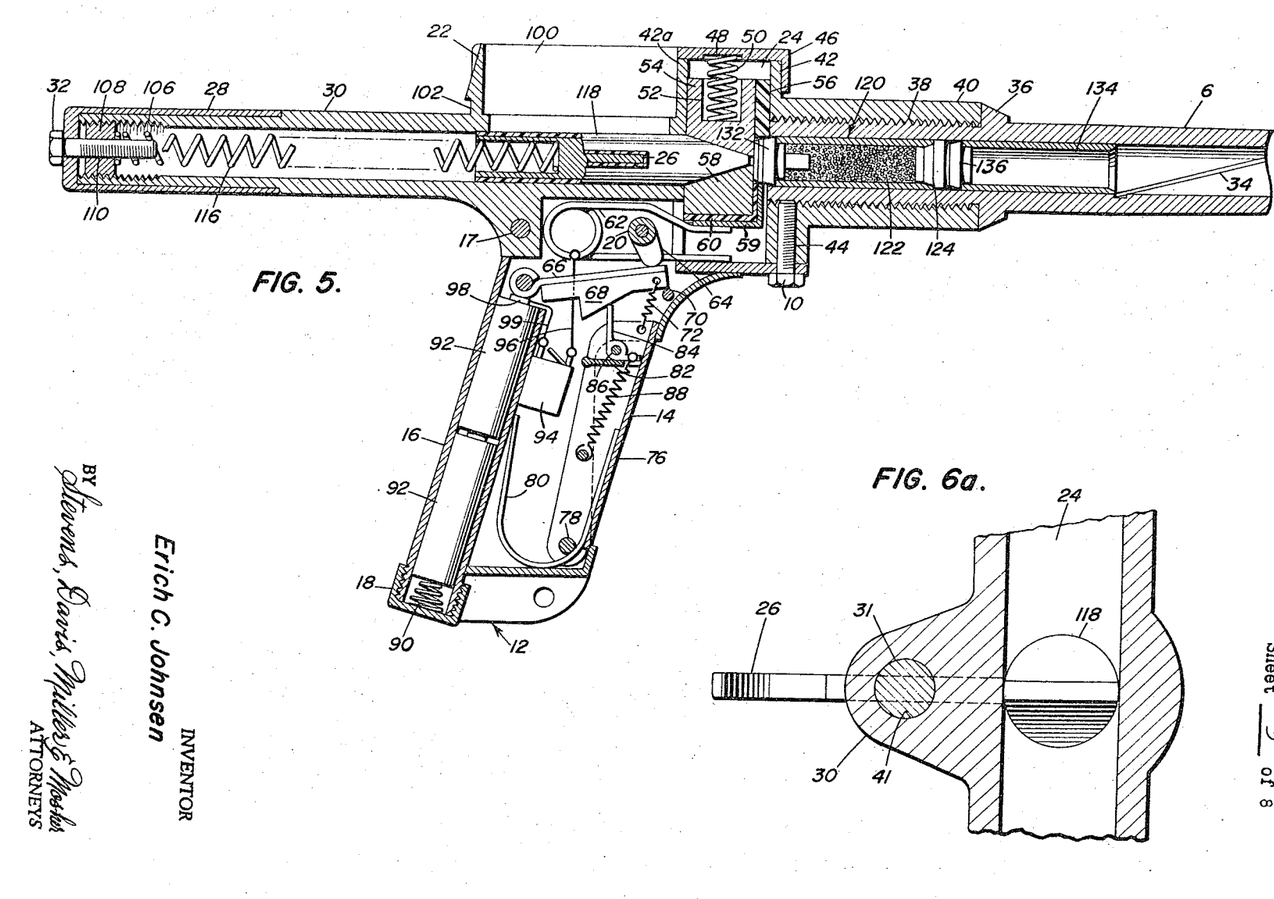
FIGURE 5 is a cross-sectional view of the gun of the present invention taken along the line 5—5 of FIGURE 2.
FIGURE 6a is a cross-sectional view taken along the line 6a—6a of FIGURE 6.
Figure 6:
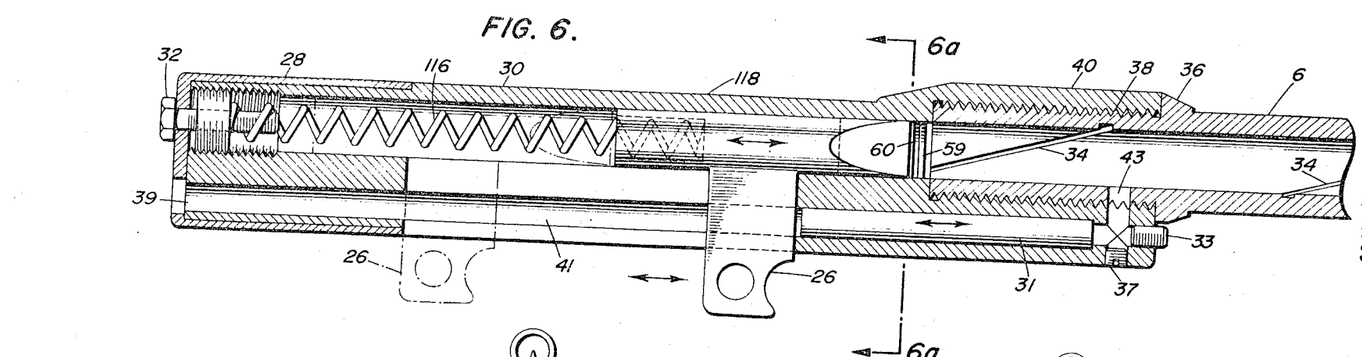
FIGURE 6 is a cross-sectional view of the gun of the present invention taken along the line 6—6 of FIGURE 1.

Referring now to FIGURES 5 and 6, there is shown the preferred embodiment of the gun in accordance with the present invention with a gun barrel 6 having rifling 34 therein in a helical pattern to provide rotation to bullets or cartridges passing therethrough in the conventional manner. The barrel includes a threaded portion 38 which screws into a threaded extension 40 of the pistol case 30 and which mates with the flange 36 on the barrel 6 and which includes a flanged portion 42, which forms part of the magazine receiver and breech block wall. A set screw 10 in threaded hole 44 secures the barrel 6 in extension 40.

A rectangular breech block compartment 24 is provided between the flange 42 and the magazine receiver wall 42a.

The breech block cover 46 extends over the flange member 42 and includes a recessed portion therein 48 for receiving the upper breech block compression spring 50 which is mounted in a recess 52 of the upper tapered breech block 54. A nylon glide 56 is attached to the upper breech block 54 and provides a low friction surface to provide easy sliding thereof in the area 43. The lower tapered breech block 58 has an electrical insulator strip 60 which insulates the contact strip 59 from the breech block 58. The nylon glide 56, the insulator strip portion 60 and the breech blocks 54 and 58 form an aperture to the barrel 6 for projection of projectiles through the breech blocks into the barrel. A compression and contact spring member 62 is positioned below the lower breech block and provides an upward force to the lower breech block 58. The gun includes a safety lock 20 having a rotatable member 64 which can be of nylon or some other non-conducting material, the member 64 resting against a friction contact brass bar 66 which rests upon a contact block 68 formed of nylon or any equivalent non-electrically conducting material. The safety lock 20 is shown in the locking position, the nylon safety lock portion 64 thereof thereby preventing contact between the friction contact brass bar 66 and the compression and contact spring 62. Also positioned within the handle portion 12 is a rest pin 70 which prevents clockwise rotation of the nylon contact block 68 beyond a predetermined position.

A tension return spring 72 is secured to an aperture in the contact block 68 and is also secured at its other end in an aperture formed in the trigger 14 which includes an insulating member 76. The trigger 14 is pivotable about a pivot 78 and is secured to a trigger compression return spring 80 which is a U-shaped spring having the other portion of the U resting against the battery case 16 and which passes below the pivot 78. A toggle actuator base 82 is secured to the trigger portion 14 and includes a toggle actuator 84 which is pivotable about a pivot 86 and is biased in a clockwise going position by a toggle actuator tension return spring 88 which is secured to the toggle actuator 84 and to the trigger portion 14. The battery casing 16 includes a battery compartment cap 18 having a compression spring 90 therein in contact with the negative pole of the batteries 92 positioned within the battery casing 16.

Also included within the handle 12 is a bi-metallic switch device 94 which is coupled to the compression and contact spring 62 by an electrical connecting wire 96. The other contact of the bi-metallic switch 94 is connected through a connecting wire 99 to a contact member 98 which is in contact with the positive terminal of the batteries 92 as well as with the friction contact brass bar 66. The gun also includes a projectile insert 100 which can retain a magazine and which includes a magazine locking notch 102 for securing the magazine thereto.

The pistol case 30 is a hollow metallic section having an inner threaded portion 106 onto which is threaded a recoil spring tension adjustment nut 108 having a threaded central portion 110. The end cap 28 of the pistol case is secured thereto by an end cap fastening screw 32 which is secured to the recoil spring tension adjustment nut 108 and provides a rotary motion thereto when rotated due to the threading 110 therein. The recoil tension spring 116 is mounted in the hollow portion of the pistol case 30 and rests against the load piston 118 at one end thereof and against the recoil spring tension adjustment nut 108 at its other end. The load piston 118 includes, as a part thereof, the loading handle 26. The cartridges are loaded into the barrel 6 through the tapered breech blocks in a manner to be described in more detail hereinbelow by movement of the loading handle 26 from the position shown in dotted lines of the loading handle 26 to the extreme forward position of the handle 26 as shown in FIGURE 6. The loading piston 118 may be formed of aluminum and may be preferably nylon coated or coated with any other suitable lubricating material except at the front tip thereof which abuts the cartridges. Positioned within the barrel 6 of the gun is a projectile 120 which includes a propelling charge 122 therein. The projectile includes a positive contact ring 123 in the end cap 132 which contacts the positive lead 59 on the lower breech block 58, the positive lead 59 being in contact with the compression and contact spring 62. The projectile 120 also includes a nylon top cap 124 which is positioned in the steel sleeve 126 having a nylon sleeve 128 thereon. Also positioned within the projectile is an ignitor capsule 130 (to be explained in detail hereinbelow). The end cap 132 of the projectile 120 is secured at the end of the projectile which is preferably formed of nylon and which has a negative contact 125 thereon which contacts the non-coated tip of the load piston 118. The barrel also includes a projectile sleeve 134 from the previously fired spent projectile and the end cap 136 thereof still positioned within the barrel for later firing. The end cap is preferably formed of nylon or some non-conductive material.

The pistol case 30 also forms a hollow channel 41 (best shown in FIGURES 6 and 6a), which includes an orifice 43 communicating with the hollow portion of the barrel 6 and which includes gas pressure adjustment screws 33 and 37 and a gas outlet 39. Positioned within the channel 41 is a gas operated loading piston 31 which can be formed, for example, of nylon and which is movable in the channel. The piston 31 abuts the loading handle 26 of the load piston 118 as it travels toward the rear portion of the pistol case, thereby moving the load piston against the bias of the recoil spring as shown in phantom in FIGURE 6 to allow automatic reloading of the gun. This operation will be described in greater detail hereinbelow.

Figure 7:
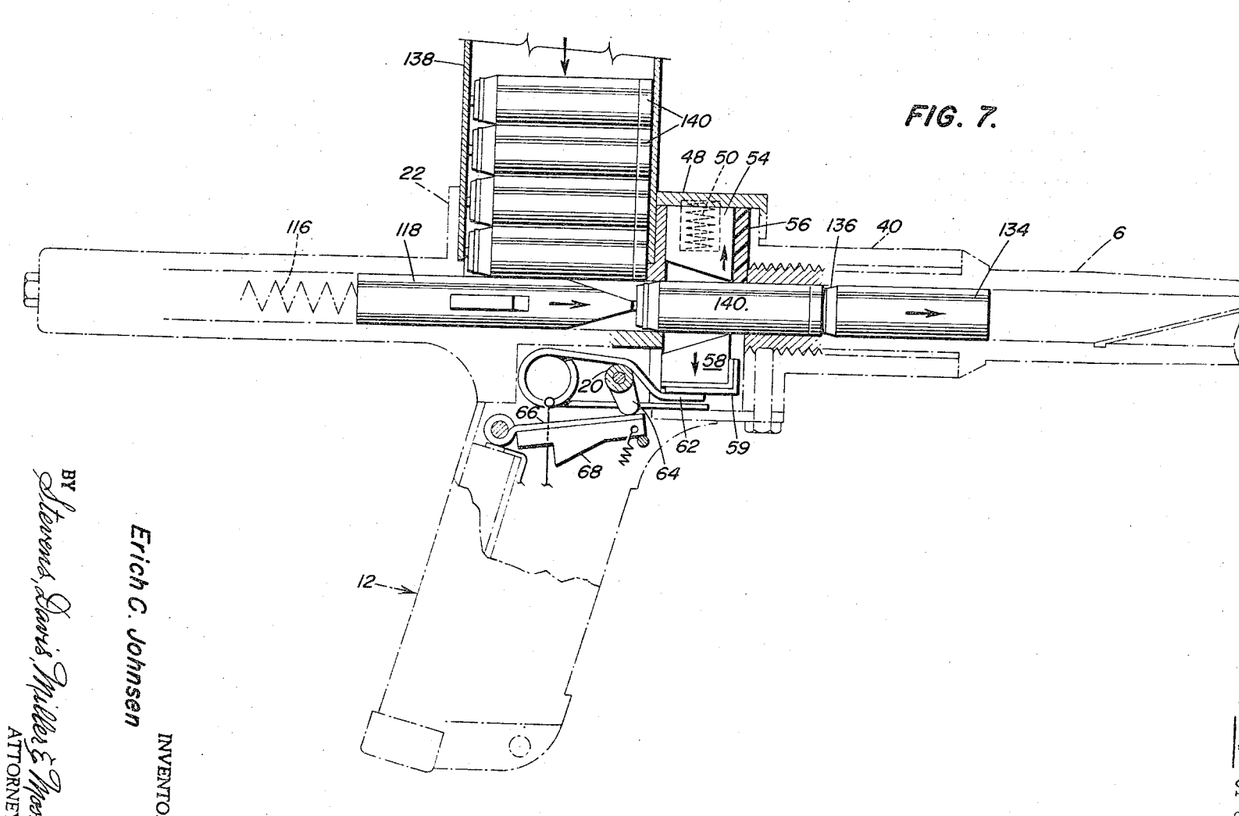
FIGURE 7 is a view partly in elevation and partly in section of the preferred embodiment of the gun of the present invention during the loading operation of a bullet or cartridge.

Referring to FIGURE 7, the operation of the preferred embodiments of the gun in accordance with the present invention will now be described in detail wherein a cartridge is to be loaded from the magadine 138 into the gun barrel 6. The cartridges 140 and the magazine 138 have a downward force applied thereto by means of a spring or the like (not shown). The safety lock 20 is in position to prevent firing of the gun. The hand loading handle 26 of the loading piston 118 is then pushed backward toward the rear of the gun to compress the recoil spring 116 (also shown in FIGURE 6). This allows one of the bullets 140 from the magazine 138 to fall into the chamber opposite the tapered breech blocks 54 and 58. The recoil tension spring 116 then pushes the loading piston 118 and the bullet 140 which contacts the upper and lower breech blocks and causes them to separate due to the taper therein by forcing these breech blocks to move against the bias caused by the tension springs 50 and 62. The cartridge 140 is continually advanced until it is fully within the barrel 6 of the gun and has fully passed the breech blocks. The sleeve 134 from the prior cartridge which has been fired and which has remained in the barrel is pushed ahead as the cartridge 140 enters the barrel, the end cap 136 from the cartridge 134 separating the cartridges 140 and 134 within the barrel. As the load piston 118 is then retracted back through the hollow portion of the pistol case 30, the breech blocks 54 and 58 will again be forced together by the springs 50 and 62, and thereby isolate the barrel 6 from the pistol case 30 and the magazine 138, except for the contact between the load piston 118 and the contact 125, to prevent any problems during firing of the cartridges. The cartridge 140 is now in position to be fired by turning the safety lock 20 in a clockwise direction and removing the block 64 against the contact brass strip 66 (FIGURE 5). Pressing of the trigger 14 causes the toggle actuator 84 to lift the slanted nylon contact block 68 by a camming action until the friction contact brass bar 66 touches the contact spring 62. In this position, the electric current path is completed. The batteries 92 then send current via the friction contact brass bar 66 and the compression and contact spring 62 to the positive lead 59 on the lower breech block 58 and then to the positive contact ring 123 on the projectile which is positioned in the nylon end cap 132 thereon. Current then flows through the cartridge 140 in a manner to be discussed in detail hereinbelow and then through the negative contact 125 to the load piston 118, then the pistol case 30 and back to the negative battery terminal.

Figures 8, 9:
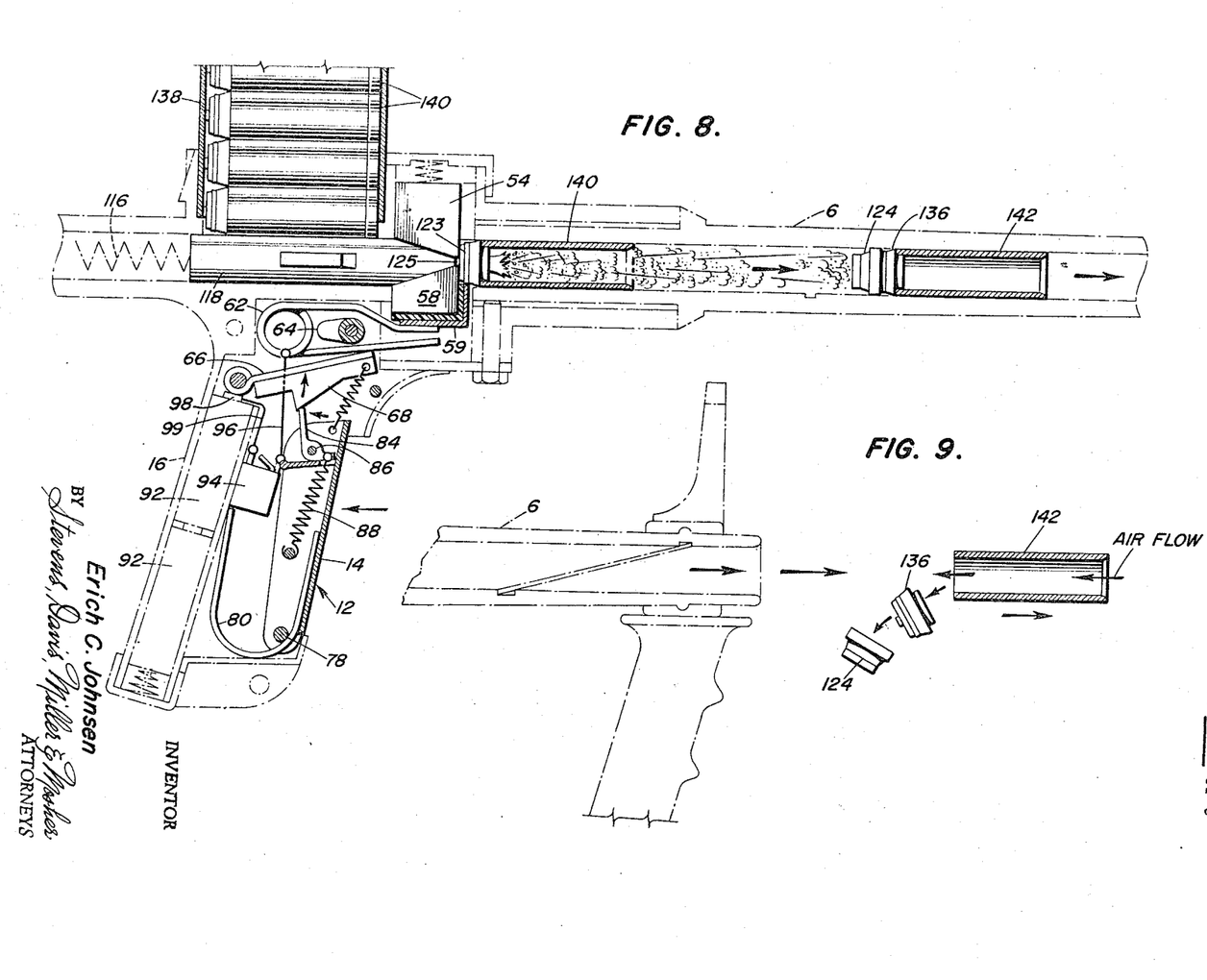
FIGURE 8 is a view in section of the gun in accordance with the present invention as it appears during the firing of a cartridge.
FIGURE 9 is a view in section of the flight of the cartridge along with the end cap and top cap of the prior bullet after ejection from the gun barrel.

Referring now to FIGURE 8, there is shown a cross-sectional view of the gun as it would appear shortly after firing of a cartridge by depression of the trigger as described hereinabove. The safety lever 20 has been turned in a clockwise direction to the "on" position to allow firing of the gun by depression of the trigger. The trigger 14 has been depressed and has caused the toggle actuator 84 to ride along a camming surface on the contact block 68 and thereby force the brass contact bar 66 against the compression and contact spring 62. In this manner, as explained above, current is supplied from the battery and through the friction contact brass bar 66 and the compression and contact spring 62 on the lower breech block to the positive contact ring 59 contacting the end cap of the cartridge 140 and the positive contact ring 123 thereon. The load piston 118 provides a common ground through the gun frame 30 to the compression spring 90 coupled to the negative pole of the batteries by way of the negative contact 125 on the end cap of the bullet 140.

The application of the current to the bullet 140 causes an explosion in the ignitor capsule 130 and ignition of the main propelling charge 122 therein. Gas pressure is produced and pushes against the top cap 124 and also is bled off toward the load piston. The top cap 124 of the bullet 140 and the end cap 136 of the bullet 142 are then forced through the barrel by the explosion and cause the sleeve from the previously fired cartridge to move along therewith with a spinning motion caused by the rifling in the barrel. After the bullet leaves the barrel 6 of the gun (see particularly FIGURE 9), air flow passing through the cartridge sleeve 142 will force the end cap 136 and the top cap 134 out of the cartridge and these elements will fall to the ground as the cartridge sleeve 142 proceeds to its destination.

As mentioned hereinabove, part of the gas pressure formed by the explosion is directed through an opening 43 (FIGURE 6) from the barrel 6 to the gas operated loading piston 31 which pushes against the loading piston 118. This action causes rearward movement of the loading piston 118 and compression of the recoil spring 116. When the loading piston is fully retracted, a new projectile is forced into the loading chamber from the magazine 138 in the manner described hereinabove. When the gas pressure drops to a sufficiently low value, and after the projectile 134 leaves the barrel 6, the recoil spring 116 pushes the load piston 118 and the new projectile 140 between the tapered yielding breech blocks 54 and 58. When the projectile is completely pushed between the breech blocks, the breech blocks return to the original closed position in the manner described hereinabove whereby the lower breech block 58 with its current carrying strip 59 comes in contact with the positive ring 123 and the projectile. This will cause further firing of the gun providing the trigger is still in the retracted or contact position. Otherwise, the gun is merely again reloaded and in condition for operation.

Figures 10, 11:
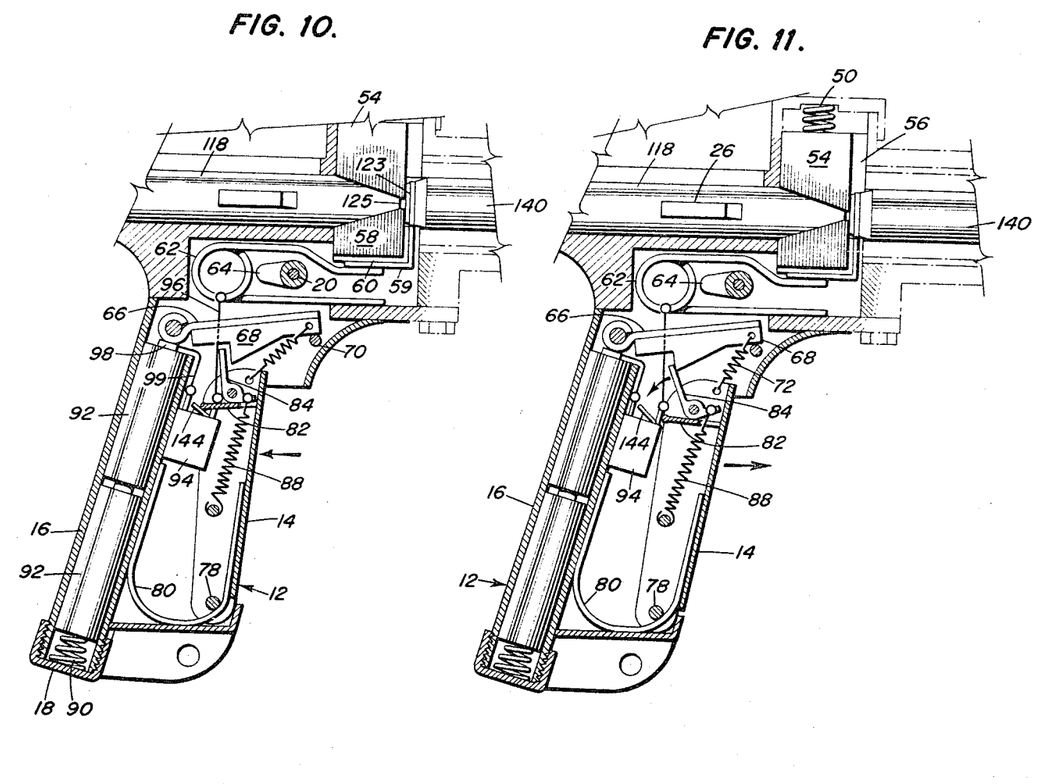
FIGURE 10 is a view in cross-section of the trigger mechanism and associated apparatus of the gun of the subject invention with the trigger in the second position to provide multiple, equally spaced firings by the gun.
FIGURE 11 is a cross-sectional view of the trigger mechanism and associated apparatus of the present invention after release of the trigger to break electrical contacts.

Referring now to FIGURE 10, there is shown a partial cross-section of the gun with the trigger in the completely retracted position to provide rapid firing of a plurality of cartridges in a predetermined sequence. When the trigger 14 is retracted to its second or most depressed position, the base 82 of the toggle actuator 84 presses against the lever 144 of the bi-metallic switch 94. Increased pressure on the trigger 14 decreases the amount of contact movement of the unit which results in more contact cycles in a shorter time or increased firing rate. Current will now pass along the lead 96 to the compression and contact spring 62 and then through the contact strip 59 on the lower breech block to the ignitor cap or positive contact 123 on the projectile. The current will proceed through the ignitor section of the projectile, and then to the ground as explained hereinabove. During each firing as current passes through the bi-metallic switch 94, the heat caused by the current passing therethrough will bend the switch and break the contact, thereby breaking the flow of current. During this break of the flow of current, the bi-metallic switch will cool off and again make contact to cause firing of the next bullet and so on until all of the cartridges in the magazine have been used or until the trigger 14 is released.

As mentioned hereinabove, increased pressure against the bi-metallic switch lever 144 decreases the time lapse of the bi-metal movement within the switch 94 and therefore delivers current to the ignitor at shorter time intervals. The firing speed is thus controllable from about one-half second to the maximum return speed of the recoil spring 116 which, in turn, is controlled by the amount of gas pressure within the barrel 6 and the retarding action of the inertia of the nylon coated aluminum load piston 118 and the gas operated nylon load piston 31.

By releasing the hand pressure on the trigger 14 as shown in FIGURE 11, the toggle lever 84 will yield to the resistance found on the nylon slanted cam portion of the block 68. When the trigger 14 is returned to the starting position, the toggle lever is again in an upright position due to the tension spring 88. In turning the safety lever 20 in a counter-clockwise direction, the movement of the brass contact strip 66 is again locked. At the same time, the trigger 14 is also locked by the position of the toggle lever 84.

Figure 1:
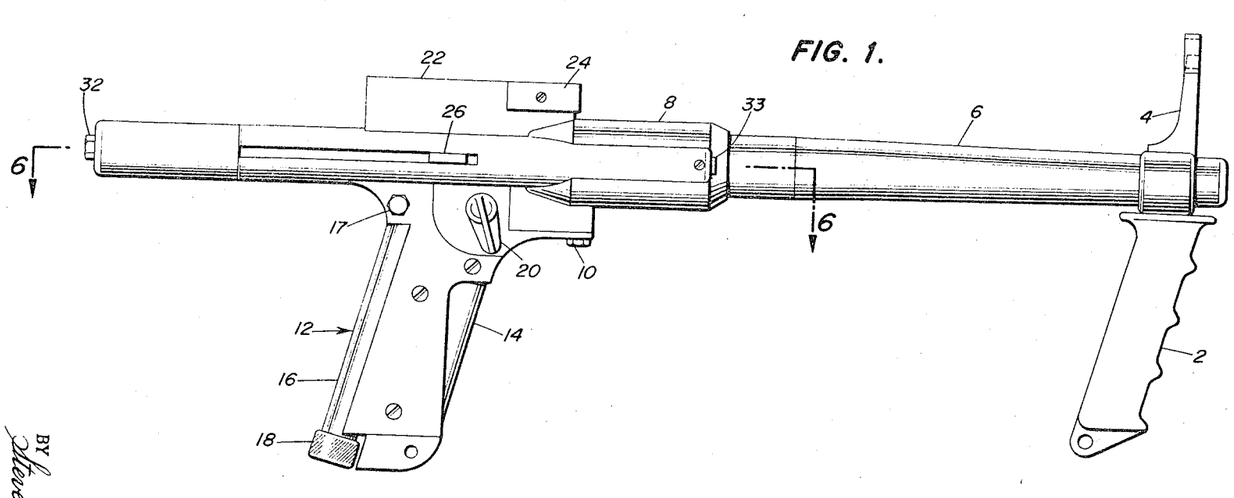
FIGURE 1 is a side view in elevation of a preferred embodiment of the gun of the present invention.
Figure 2:
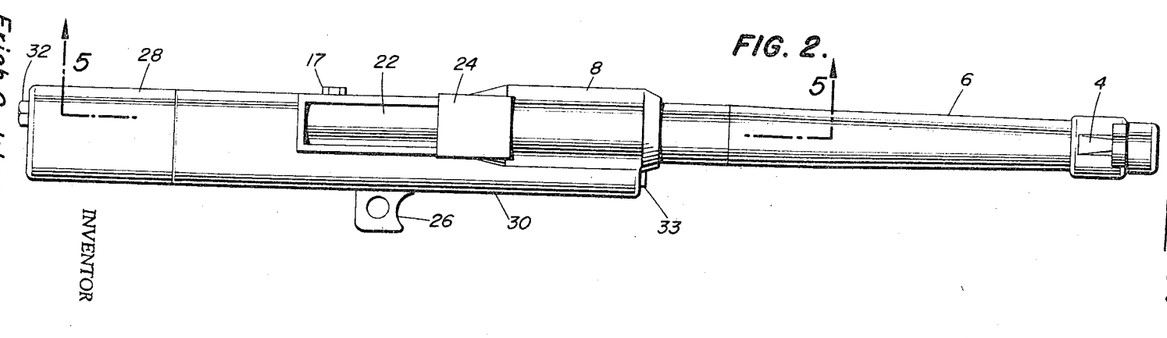
FIGURE 2 is a top view in elevation of the preferred embodiment of the gun of the present invention.
Figure 3:
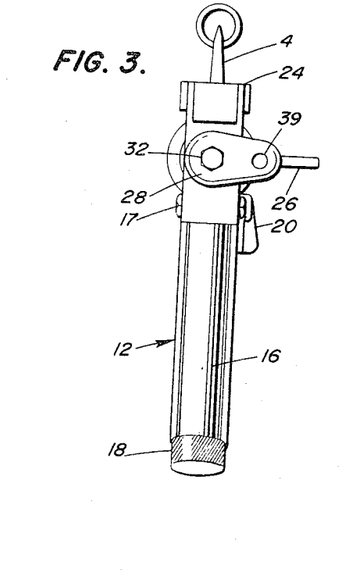
FIGURE 3 is a rear view of the preferred embodiment of the gun of the present invention in elevation.
Figure 4:
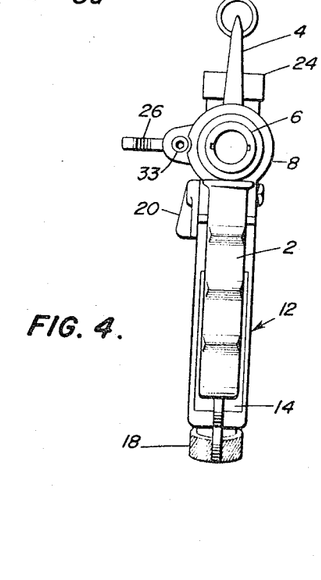
FIGURE 4 is a front view in elevation of the preferred embodiment of the gun of the present invention.
Figure 18:
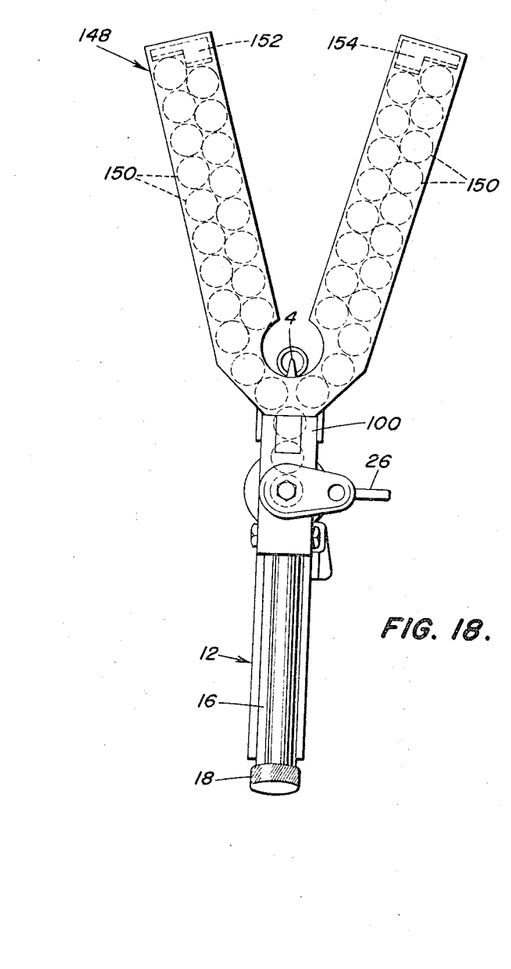
FIGURE 18 is a view in elevation of a V-type magazine which may be used with the gun in accordance with the present invention.

Referring now to FIGURE 18, there is shown a rear view of the gun in accordance with the present invention, the same as set forth in FIGURE 3 supra. In this embodiment, there is provided a V-type magazine 148 which includes a plurality of bullets or cartridges 150 therein which eventually ride down the two V-shaped members of the magazine to the projectile insert 100 whereupon the cartridges are loaded in the manner set forth herein above. Spring members or the equivalent 152 and 154 are provided to give a downward force to the bullets so that they will fall into the projectile insert in proper manner.

Figure 19:
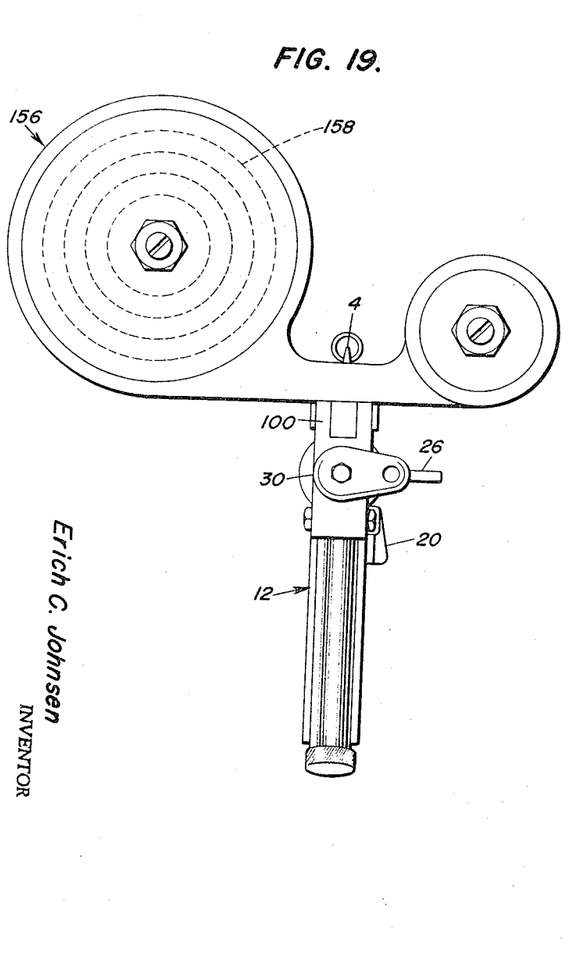
FIGURE 19 is a view in elevation of a drum type magazine which may be used with the gun in accordance with the present invention.

Referring now to FIGURE 19, there is provided a rear view of the gun in accordance with the present invention, the same as set forth in FIGURE 3 but with a different embodiment of a magazine 156. The magazine 156 is a drum type magazine wherein the cartridges will roll about in the helical track 158 to the projectile insert 100 of the gun where they are again loaded in the manner set forth hereinabove.

Figure 12:
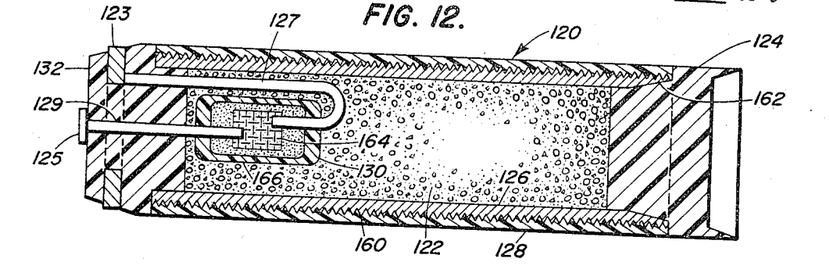
FIGURE 12 is a view in cross-section of a preferred embodiment of the cartridge or bullet in accordance with the present invention.
Figure 13:
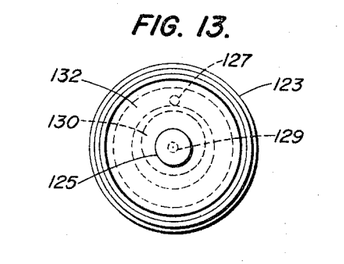
FIGURE 13 is an end view of the rear end of the cartridge of FIGURE 12.
Figure 14:
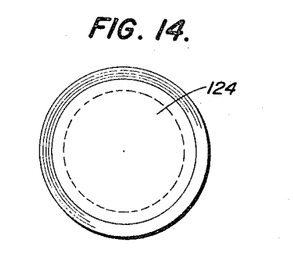
FIGURE 14 is an end view of the front end of the cartridge of FIGURE 12.

In FIGURES 12 to 14, there is set forth a preferred embodiment of the projectile as provided in accordance with the present invention. The projectile is basically a hollow steel sleeve 126 clad on the outside with Teflon or nylon 128 which acts as a sealer and lubricant when propelled through the gun barrel. The Teflon or nylon coating 128 allows a much tighter fit and contact with the lands and rifling in the barrel and therefore provides better utilization of the gas pressure which is provided by explosion of the explosives within the projectile sleeve. The Teflon or nylon coating 128 also retards wear on the barrel bore 6 while it also protects the steel projectile against corrosion. To provide a secured bond between the steel sleeve 126 and the Teflon or nylon coating 128, the surface of the steel sleeve is knurled as shown at 160. The steel sleeve 126 includes a suitable alloy which will withstand the gas pressure and will retain its original shape, such alloys being well known to those skilled in the art. Any enlargement which should occur in the sleeve 126 is corrected by the Teflon or nylon coating in regard to tolerances while traveling through the barrel. The front end of the steel sleeve 126 is tapered to provide a sharp edge for improved penetration power as shown at 162. The taper also reduces air resistance while the projectile travels to its target. The end of the sleeve 126 is closed by a nylon end cap 132 which is pressed into the steel sleeve 126. The nylon end cap 132 also carries a metal ring 123 which acts as the positive DC contact. The nylon end cap 132 also carries a small metal pin 125 at its center portion which acts as the negative DC contact. Both of the contacts 123 and 125 are embedded in the end cap 132 during the process of injection molding of the end cap or in other well known manners.

Both contacts 123 and 125 pass through a capsule 166, the contacts being connected to a fine wire mesh by wires 127 and 129 which is preferably formed from magnesium and which is labeled 164. The magnesium wire mesh 164 acts as a resistance device and converts the electric current passing therethrough into heat. The mesh 164 is enclosed by a capsule 166 which can be formed for example of glass or plastic. The capsule 166 contains oxygen or argon gas, pure magnesium powder, sodium hydroxide and sulfur. Surrounding the capsule 64 and enclosing the remainder of the hollow sleeve 126 is a main charge 122.

When an electric charge is introduced which can range from, for example, one-half volt to 220 volts, across the contacts 123 and 125, the tungsten wire 164 disintegrates rapidly and the heat produced thereby forces the sodium hydroxide, magnesium and sulfur mixture within the capsule 166 to free its oxygen content and further increases the temperature and gas pressure within said capsule. The kindling point of the double based powder within the capsule is reached and its explosion bursts the capsule 166 and ignites the main propelling charge 122. The propelling gas pressure pushes the nylon top cap 136 against the nylon end cap and empty steel sleeve of a further cartridge (explained hereinabove with regard to FIGURE 8) and the empty steel sleeve is propelled through the barrel of the gun.

Figure 15:
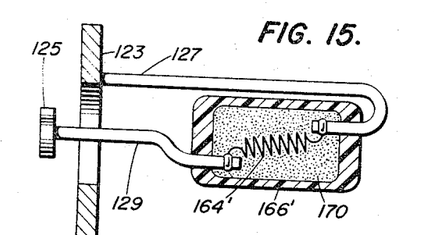
FIGURE 15 is an exploded view of a second embodiment of an ignition capsule which may be used in the cartridge of FIGURE 12.
Figure 16:
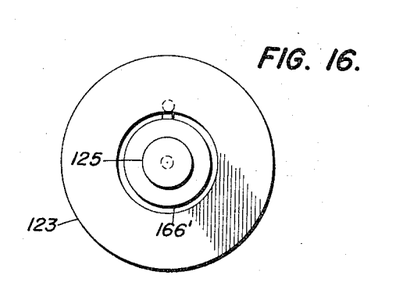
FIGURE 16 is an end view of the ignition capsule of FIGURE 15.

Referring now to FIGURES 15 and 16, there is shown an alternate embodiment of the capsule 166 as set forth in FIGURES 12 to 14. The capsule 166' includes contact members 123 and 125 as set forth previously. The contacts 123 and 125 are connected by a tungsten filament 164'. The capsule 166' also containing sulfur and magnesium powder in equal proportions and sodium hydroxide powder marked as 170.

Figure 17:
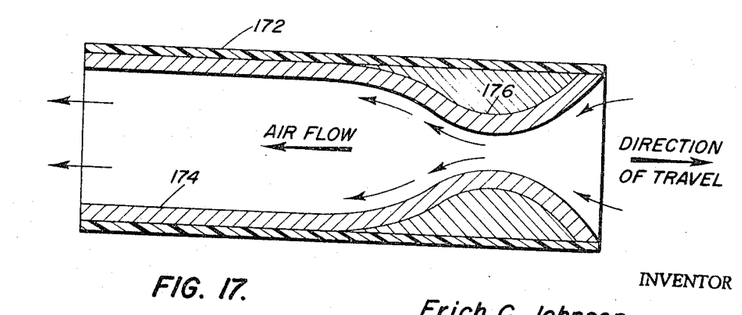
FIGURE 17 is a cross-sectional view of a second embodiment of a coated sleeve for use in the cartridge or bullet of FIGURE 12.

FIGURE 17 is a further embodiment of a cartridge in accordance with the present invention which allows for alteration of the preferred embodiment of the gun and includes a steel sleeve 174 having a depressed annular section 176 at its forward end portion with respect to the direction of travel which is filled with lead or an equivalent heavy material. A nylon or Teflon coating 172 is also provided. The lead is positioned at the forward end of the sleeve to provide proper balance and will provide the proper trajectory to the cartridge without requiring rifling in the barrel or the spinning motion produced thereby and allows for removal of the rifling 34 shown in the preferred embodiment. The weight provided by the lead lends the required balance to the cartridge in the same manner as in a weighted arrow and causes same to retain its trajectory. The taper of the depression 178 is designed to provide minimum air resistance.

What is claimed is:

1. A fire control mechanism for a gun which includes a trigger, said trigger forming at least a part of a switch in an electric firing circuit, a bi-metallic switch member actuated by depression of said trigger to continuously fire the gun while the trigger is depressed, said trigger position providing a predetermined bias on said bi-metallic switch, and firing circuit means including said bi-metallic switch.

2. A fire control mechanism for a gun having an electrically fired cartridge comprising a source of electrical energy, a trigger, a switch operated by the trigger in series with said source, and a breech having opposed slidably mounted blocks, having spaced insulated surfaces, one of said surfaces being connected to the switch and the other to the source for engagement with contact surfaces of the cartridge to complete a first firing circuit when the trigger is actuated, a second firing circuit comprising a periodically operating switch, and means operated by the trigger for connecting said periodically operating switch in series with the source and one of said spaced surfaces and for simultaneously opening the first firing circuit.

3. A mechanism as defined in claim 2 wherein said periodically operating switch comprises a bi-metallic member.

4. A fire control mechanism for a gun having an electrically fired cartridge comprising a source of electrical energy, a trigger, a switch operated by the trigger in series with said source, and a breech having opposed slidably mounted blocks, having spaced insulated surfaces, one of said surfaces being connected to the switch and the other to the source for engagement with contact surfaces of the cartridge to complete a first firing circuit when the trigger is actuated, said blocks having opposed tapered surfaces defining a V-shaped slot and yieldable means urging said blocks toward engagement, one of said yieldable means comprising an electrical conductor connected to said one of said surfaces and comprising a contact of said switch.

5. A mechanism as defined in claim 4 further including a loading piston having a tapered end congruent with the taper of the blocks and means mounting said piston for reciprocating said tapered end into and out of said slot.

6. A mechanism as defined in claim 5 further including means for moving the piston away from said blocks for loading a cartridge between said piston and blocks, and means urging the piston and cartridge toward said blocks for moving the cartridge beyond the blocks and into the barrel.

7. A mechanism as defined in claim 5 wherein said cartridge comprises a sleeve containing an explosive mixture, a heat producing means in said mixture, and means connecting said contact surfaces to said heat producing means.

8. A mechanism as defined in claim 7 further including a resilient coating on the sleeve.

References Cited

UNITED STATES PATENTS

| | | | |
|---|---|---|---|
| 337,872 | 3/1886 | Russell | 42—84 |
| 1,314,761 | 9/1919 | Smith | 89—135 |
| 2,313,030 | 3/1943 | Tauschek | 89—135 |
| 2,466,929 | 4/1949 | Catlin et al. | 89—135 |
| 2,831,402 | 4/1958 | Taslitt | 89—28 |
| 3,208,181 | 9/1965 | Calhoun et al. | 42—84 |
| 2,839,966 | 6/1958 | Lord | 89—22 |

FOREIGN PATENTS

| | | |
|---|---|---|
| 710,250 | 6/1954 | Great Britain. |

BENJAMIN A. BORCHELT, Primary Examiner.

STEPHEN C. BENTLEY, Assistant Examiner.

U.S. Cl. X.R.

89—24